July 4, 1950            G. H. FUEHRER            2,513,858
SELF-CENTERING CHUCK
Filed June 9, 1948            3 Sheets-Sheet 1
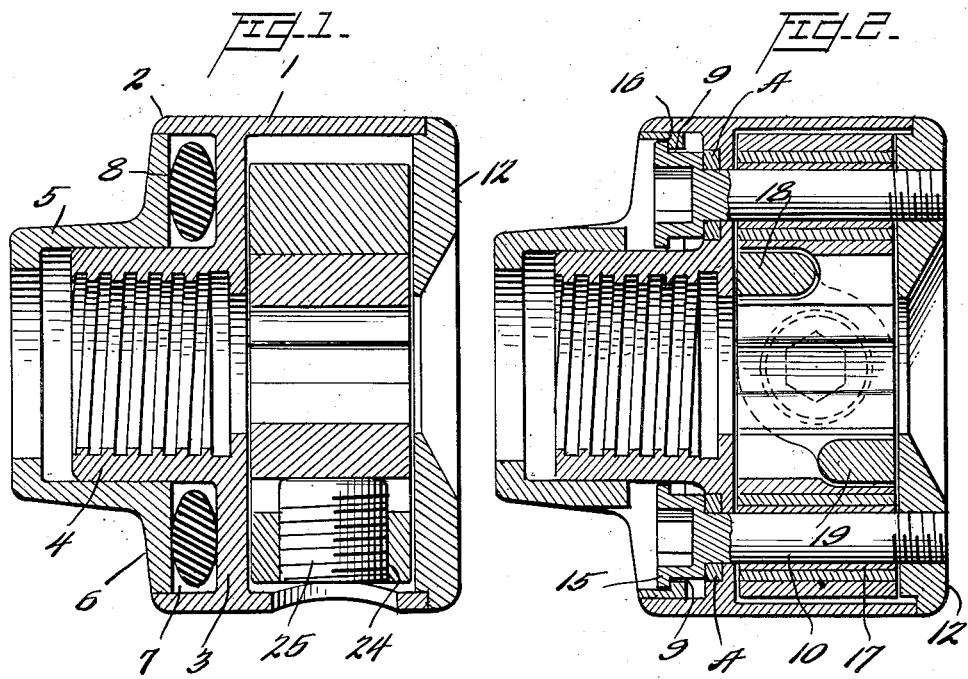
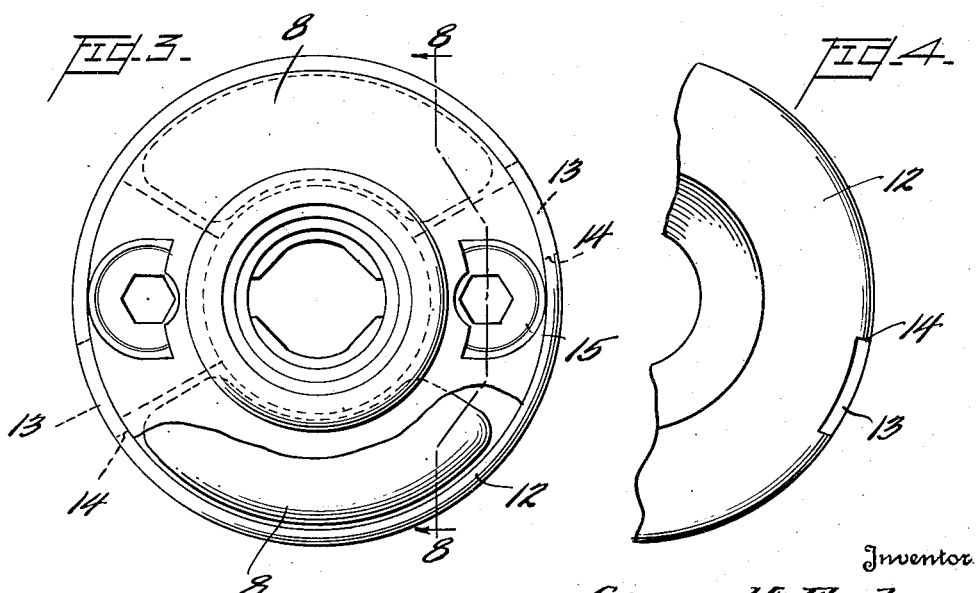
Inventor
George H. Fuehrer
By E. E. Grigg
Attorney July 4, 1950 G. H. FUEHRER 2,513,858
SELF-CENTERING CHUCK
Filed June 9, 1948 3 Sheets-Sheet 2
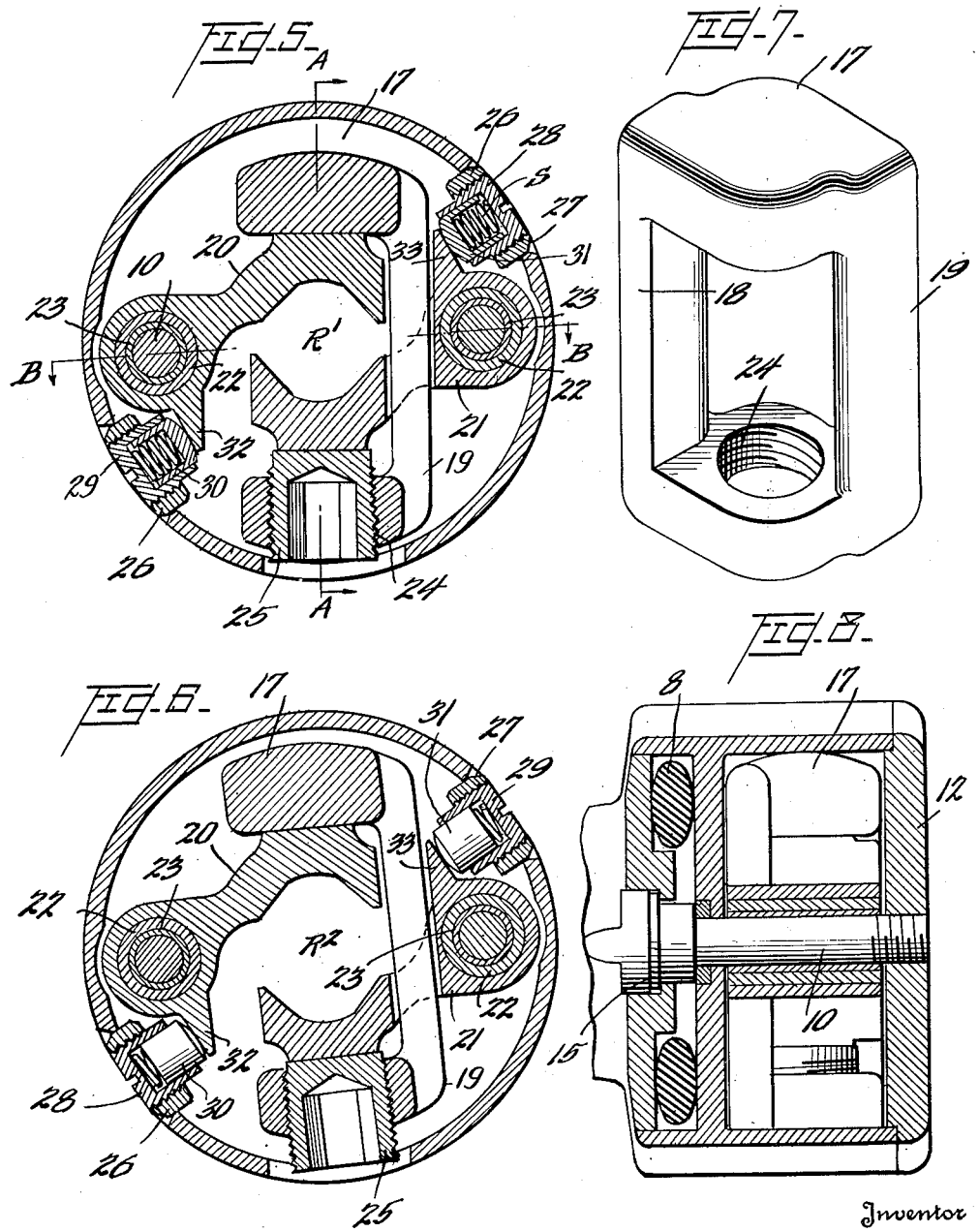
Inventor
George H. Fuehrer,
By S. S. Gregg
ATTORNEY July 4, 1950 G. H. FUEHRER 2,513,858
SELF-CENTERING CHUCK
Filed June 9, 1948 3 Sheets-Sheet 3
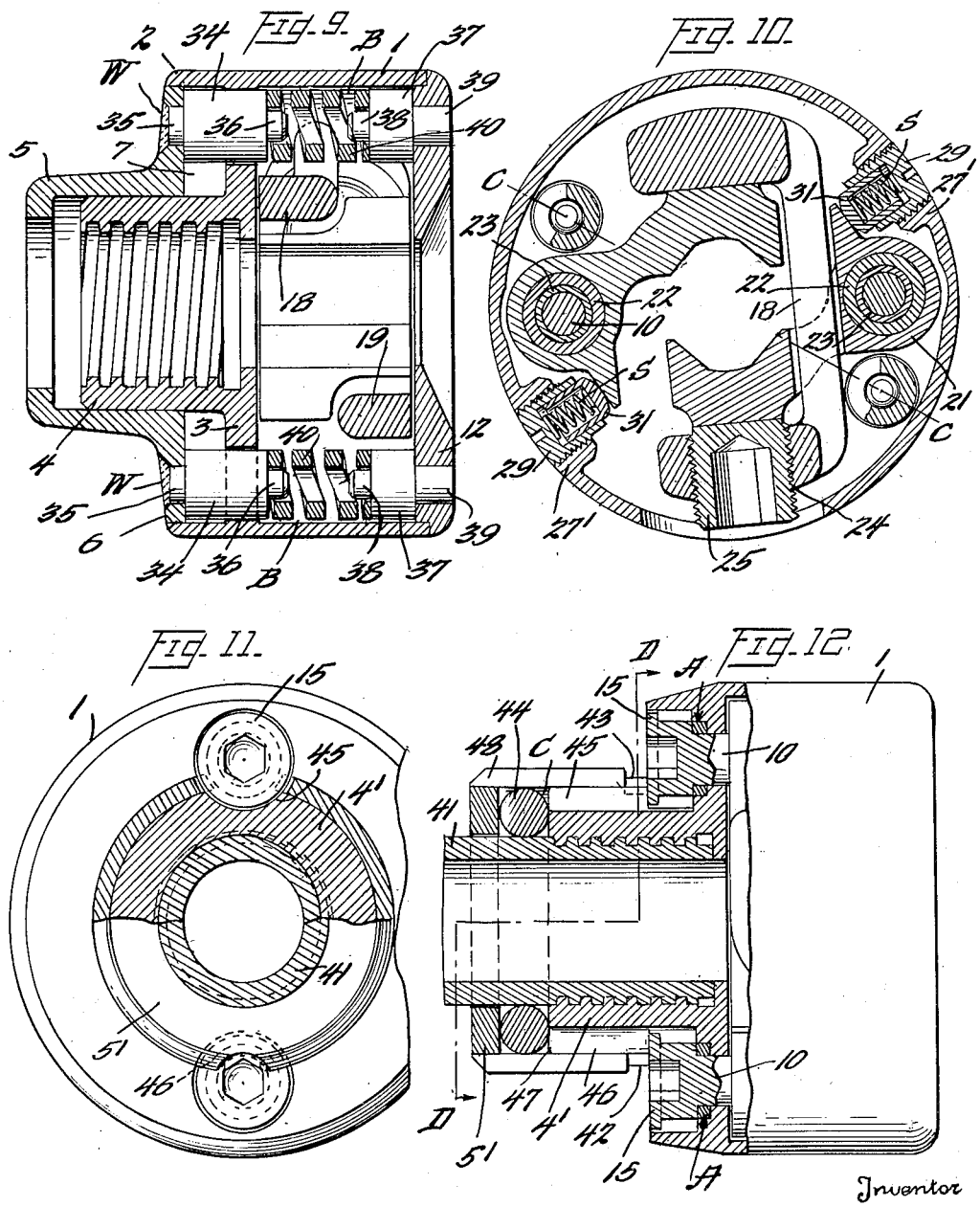
Inventor
George H. Fuehrer
By S. E. Grigg
Attorney Patented July 4, 1950

2,513,858

UNITED STATES PATENT OFFICE 2,513,858

SELF-CENTERING CHUCK

George H. Fuehrer, Los Angeles County, Calif.

Application June 9, 1948, Serial No. 31,882

11 Claims. (Cl. 279—33)

This invention relates to chucks and more particularly to a self-centering chuck intended primarily for use with diamond core drills.

It is well known to those skilled in the art that these machines are used to drill holes of selected diameters to various depths in rock. When the object of the drilling is exploration, to determine the existence or extent of ore bodies, or the subsurface structure of supporting ground for dams, abutments, or other heavy masonry, a core is taken from the hole, to provide a positive proof of underground conditions.

When exploration is not desired, a plug bit is used instead of a core bit. This bit reduces all of the rock within its capacity to cuttings, thereby leaving no core. This hole may be filled with powder, and blasted, or may be used to force grout, underground to strengthen the natural formation.

A machine of this type is provided with a hollow feed screw, one end of which is externally screw-threaded and adapted to receive the improved chuck. Normally, the core barrel is between 5 and 10 feet in length and therefore it is expedient to introduce the core barrel through the hollow feed screw and thence to the chuck. After the core barrel is properly positioned, the chuck is tightened thereon and the machine is set into operation. When the bit and core barrel have advanced into the rock, to the limit of the machine's feed, usually 24 inches, the chuck is loosened from the core barrel and returned to its original position. The chuck is retightened on the core barrel and the machine is ready for another drilling cycle.

Heretofore, practically all chucks in everyday usage have employed diametrically opposed screws for holding and centering the drill-rod. However, these devices are cumbersome since it is necessary to make frequent adjustments of the screws to center the drill-rod. Moreover, the fact that the rods must be centered by sight when the chuck is rotating necessitates frequent stopping of the machine and, therefore, consequent loss of time.

One object of the present invention is to provide a device for automatically centering the drill-rod, regardless of diametral variation in the rod caused by wear.

Another object is to provide a simplified jaw engaging means which will facilitate entry of the drill-rod.

Still another object is to provide a novel yoke actuating means which simultaneously adjusts the gripping jaws into a centralizing position.

A further object is the provision of a cushioning means carried by the chuck for preventing transmission of shock or injury to the chuck or the machine when the former is jammed against the machine as a result of rearward movement of the chuck preparatory to starting another drilling cycle.

These and other objects and advantages of the invention will be apparent from the following description when considered in connection with the accompanying drawings, in which:

Fig. 1 is a sectional side elevation of the chuck taken on line A—A of Fig. 5;

Fig. 2 is a fragmentary sectional elevation on line B—B of Fig. 5;

Fig. 3 is a rear elevation, looking toward the right of Fig. 1, with a portion of the chuck collar broken away to more clearly show the cushioning means;

Fig. 4 is a fragmentary outer face view of the chuck front cover plate;

Fig. 5 is a front sectional elevation of the chuck illustrating the jaws in position for gripping the smallest diameter drill-rod that the chuck is adapted to hold;

Fig. 6 is similar to Fig. 5, with the jaws in position to grip a rod of the maximum size for which the chuck is designed;

Fig. 7 is a perspective view of the jaw actuating yoke;

Fig. 8 is a fragmentary sectional elevation taken on line 8—8 of Fig. 3;

Fig. 9 is a fragmentary sectional elevation on line C—C of Fig. 10 showing a modified form of the invention;

Fig. 10 is a front sectional elevation of the modified form of chuck shown in Fig. 9;

Fig. 11 is a fragmentary rear elevation on line D—D of another modified form of chuck shown in Fig. 12; and Fig. 12 is a fragmentary sectional elevation of this modification with a portion of the housing removed.

As shown, the self-centering chuck of the invention includes a cylindrical body 1 having a rearwardly extending cylindrical rim or flange 2 defined by an integral septum or web 3, this web supporting an internally screw-threaded axially disposed sleeve element 4. A collar 5 having an inside diameter to fit snugly but slidably exteriorly of the sleeve 4, is formed with a shoulder portion 6, which, in conjunction with the rim 2 and web 3, provides a housing 7 to confine cushioning element 8, preferably of oval shape in cross-section, for a purpose later to be described.

It will be noted upon an examination of Fig. 2 that the shoulder portion 6 of collar 5 is apertured as at 9 to receive hollow-headed bolts 10 which, in addition to forming trunnions for jaws 20 and 21, retain the centrally apertured cover plate 12 assembled with the chuck body. The heads of the bolts 10 are flanged, as at 15, to thereby secure the collar member to the chuck body and limit its outward axial movement under the influence of the cushioning means 8. It will readily be seen that the flanges 15 perform the function of stops as well as securing the collar plate to the body. By means of the lock washers A applied to the bolts 10 loosening of the bolts is guarded against and proper assembled condition of the parts of the chuck is assured. The chuck body has two diametrically opposed tongue members 13 (see Figs. 3 and 4) which engage slots 14 in the edge of the cover plate, thereby facilitating alignment and preventing rotation of said plate on the body.

Having reference particularly to Fig. 5, it will be seen that the drill-rod gripping mechanism includes a yoke member 17, more clearly shown in perspective in Fig. 7, having offset arms 18 and 19 which straddle gripping jaws 20 and 21. These gripping jaws are pivoted on the bolts 10 and are provided with resilient sleeves 22 for eliminating transmission of shocks from the drill-rods to the machine, steel bushings 23 being interposed between the sleeves and bolts to present wear resistant surfaces for guarding against frictional destruction of the resilient sleeves. One end of the yoke has an internally screw-threaded bore 24, adapted to receive an adjustable jaw actuating screw element 25 (see Figs. 1 and 5).

At substantially diametrically opposed positions in the body 1 are mounted internally screw-threaded cap members 26 and 27, which may be secured to the body in any suitable manner. These cap members receive externally screw-threaded hollow guides or nuts 28 and 29 to receive spring-urged cup-shaped elements 30 and 31, which press respectively against fingers 32 and 33 offstanding substantially radially from the respective jaw members 20 and 21 to normally bias the jaw members into a position of maximum separation.

As hereinbefore indicated, Fig. 6 shows the chuck gripping jaws 20 and 21 in position for gripping a drill-rod of the maximum diameter for which the chuck is adapted, whereas in Fig. 5 they are in position to grip a drill-rod of the smallest diameter the chuck is adapted to accommodate. The chuck may be made in sizes to accommodate various ranges in diameter of standard drill-rod. For example, a selected chuck may accommodate diameters from 1⅛″–1½″. This range is sufficient to handle the "E" size rod and core barrel, for which the blast hole diamond drill is designed.

Again having reference to either Figs. 5 or 6 it will be seen that the jaws are self-centralizing merely by inserting the proper sized wrench in the screw element 25 and rotating the same in the desired direction. By rotating screw 25 in a clockwise direction jaw 21 is urged into work-engaging position and simultaneously with this operation the yoke is pulled in a lateral direction thereby moving the adjacent jaw 20 also into work engaging position. Upon counterclockwise movement of the screw 25, and the cooperation of the spring urged cup members 30 and 31, with their respective jaw carried fingers the work engaging means are disengaged from the drill-rod.

With reference to the first of the modified forms of my invention, and particularly that clearly shown in Fig. 9, it will be noted that the rubber cushioning element 8 has been removed from the housing 7 and for this has been substituted a novel form of spring operated cushioning means, generally indicated at B. In this modification there is provided a substantially cylindrical element 34 which has offstanding ears 35 and 36, respectively. Ear 35 may be secured to shoulder 6 in any suitable manner, such as by welding, indicated at W. Integrally secured to the cover plate 12 is an element 37 provided with ears 38 and 39, respectively. As illustrated the body portion 37 is somewhat smaller in overall length than that of element 34. However, the shape and length of these members is immaterial. The important feature residing in constructing and arranging the elements in such a manner as to accommodate the spring shown at 40. It will be readily understood that any shock which normally would be transmitted to the machine by jamming the chuck thereagainst during a drilling cycle will also be reduced to a minimum by this construction and as efficiently as by that arrangement shown in the other figures.

Having reference to either Fig. 11 or 12 it will be seen that the machine feed screw is illustrated at 41 with the chuck threaded thereon. In lieu of the collar 5 illustrated in the various other figures throughout the case there is provided a modified form of collar 5′. Here again the collar is secured to the chuck by the flanges 15 of bolts 10. In this form of the invention the collar is notched as at 42 and 43 to receive the flange 15 of said bolts. A chamber C which is adapted to receive the resilient member 44 is formed by the base 47 of the sleeve 4′ and the flanged end 48 of the collar 5′. In assembling this type of chuck the resilient annulus 44 is positioned within the chamber C and the flanges 15 of the bolt 10 are placed in the notches 42 and 43, and, thereafter these parts are introduced as a unit into assembled relation with the chuck housing. The notches in collar 5′ provide for a limited amount of axial sliding movement of the collar with respect to the bolts and chuck, while the latter is in operation. The sleeve 4′ is also modified to the extent that there are diametrically disposed channels 45 and 46, respectively, which permit the insertion of the bolts 10. See Fig. 11 or 12.

It will, of course, be understood that a compression spring of suitable size could be substituted for the resilient annulus 44 illustrated in Fig. 12.

Various changes and modifications are considered to be within the principle of the invention and the scope of the following claims.

I claim:

1. In a self-centering chuck, a body having an axial aperture to receive a work-piece, jaw means carried by said body for movement transversely of said aperture from work-piece gripping to work-piece releasing position and vice versa, yoke means movable relatively to said jaw means and transversely of said aperture but in unobstructing relation thereto, means carried by said yoke means for engaging said jaw means to limit work-piece releasing movement thereof, and means carried by said yoke means for adjusting said jaw means into work-piece gripping position, the transverse movability of said yoke means permitting self-centering gripping action of said jaw means upon a work-piece under the influence of said adjusting means.

2. A self-centering chuck having an axial aperture to receive a drill-rod; comprising a body provided with means to attach said chuck to a machine spindle, a flanged collar mounted for limited axial movement relatively to said body, a relatively fixed web in juxtaposition to said flange and segmental resilient elements interposed between said flange and web.

3. A self-centering chuck comprising a body, tool gripping jaw means mounted within said body and adapted to oscillate in a plane transverse to the axis of said body, a yoke member straddling said jaws, and jaw actuating means for said yoke.

4. A self-centering chuck comprising a body having an axial aperture, rod gripping jaw means mounted within said body and adapted to oscillate in a plane transverse to the axis of said aperture, integral offstanding finger members on said jaws, body carried spring elements engaging said fingers, yoke means straddling said jaws, and jaw actuating means for said yoke.

5. A self-centering chuck comprising a body having an axial aperture, a relatively fixed web carried by said body, a flanged collar fastened to said body in juxtaposition to said web, a resilient element interposed between said web and flange, rod gripping jaw means mounted within said body and adapted to oscillate in a plane transverse to the axis of said aperture, yoke means straddling said jaws, and jaw actuating means for said yoke.

6. A self-centering chuck comprising a body having an axial aperture, rod gripping jaw means mounted within said body for oscillation in a plane transverse to the axis of said aperture, substantially diametrically opposed spring members projecting from said body for engaging the rear faces of said jaws, yoke means straddling said jaws, and means carried by said yoke means for actuating said jaws.

7. A self-centering chuck comprising a body having an axial aperture, a cover plate and flanged collar element, bolt means for securing said plate and collar element to adjacent ends of said body, said collar being constructed and arranged for limited axial movement relative to said body, superimposed sleeves carried by said bolt means, work gripping jaws pivoted about said bolt means and mounted for oscillation in a plane transverse to the axis of said aperture, yoke means straddling said jaws, and means connected to said yoke for actuating said jaws.

8. A self-centering chuck comprising a body having an axial aperture, a cover plate and flanged collar element, bolt means for securing said plate and collar element to adjacent ends of said body, said collar being constructed and arranged for limited axial movement relative to said body and compression spring means urging said collar into a position remote from said cover plate.

9. A self-centering chuck comprising a body having an axial aperture, a relatively fixed web carried by said body having a rearwardly and axially extending sleeve, a notched collar slidably engaging said body and mounted for limited axial movement relative thereto and a resilient element positioned in a chamber formed by the base of the sleeve and the flanged end of the collar.

10. A self-centering chuck for clamping an element to be rotated about a central axis, comprising a frame having a central aperture extending in the general direction of and including within itself the said central axis of rotation, jaw means carried within said frame for clamping and releasing the element to be rotated, a yoke extending generally transversely of the said axis of rotation, said yoke having abutments for engaging said jaw means from opposite directions respectively, means for moving at least one of said abutments to and from the other abutment for actuating said jaw means, said yoke being free of restraining connection with the frame and thus free to move for self-centering upon clamping an element to be rotated by the chuck.

11. A self-centering drill chuck for clamping and driving a drilling tool about a definite axis comprising a main frame to be driven by an actuating machine, said frame having an aperture for reception of a drill bit shank and also having a central chamber for accommodating drill bit clamping mechanism, said mechanism comprising a pair of pivot shafts mounted in said frame parallel to the said definite axis, a pair of equal length clamping lever arms mounted respectively on said shafts, said arms having clamping faces for engaging and clamping the shank of the drill bit, a yoke in said chamber floatingly arranged with respect to said chuck frame, said yoke having abutment faces for engaging said clamping levers from opposite directions, manually operated pressure means for forcing one of said faces against the said drill bit shank, whereby the other of said faces is correspondingly drawn against the opposite side of the drill bit shank, the floating arrangement of said yoke providing the self-centering characteristic of said chuck.

GEORGE H. FUEHRER.

REFERENCES CITED

The following references are of record in the file of this patent:

UNITED STATES PATENTS

| Number | Name | Date |
| --- | --- | --- |
| 1,187,920 | Muller | June 20, 1916 |
| 2,290,731 | Blazek | July 21, 1942 |
| 2,324,130 | Beckwith | July 13, 1943 |